United States Patent
Gunderson et al.

(10) Patent No.: US 6,930,858 B2
(45) Date of Patent: Aug. 16, 2005

(54) INTERNAL SUPPORT MEMBER IN A HERMETICALLY SEALED DATA STORAGE DEVICE

(75) Inventors: Neal F. Gunderson, Lake Elmo, MN (US); Wolfgang Rosner, Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/782,298

(22) Filed: Feb. 19, 2004

(65) Prior Publication Data

US 2004/0165308 A1 Aug. 26, 2004

Related U.S. Application Data

(60) Provisional application No. 60/448,229, filed on Feb. 19, 2003.

(51) Int. Cl.⁷ .............................................. G11B 33/14
(52) U.S. Cl. ................................................. 360/97.02
(58) Field of Search ........................... 360/97.02, 98.07; 310/51, 90

(56) References Cited

U.S. PATENT DOCUMENTS

| | | | |
|---|---|---|---|
| 4,367,503 A | | 1/1983 | Treseder |
| 4,488,192 A | | 12/1984 | Treseder |
| 4,556,969 A | * | 12/1985 | Treseder et al. ............ 720/736 |
| 5,097,164 A | * | 3/1992 | Nakasugi et al. ............. 310/88 |
| 5,317,462 A | | 5/1994 | Kakizaki |
| 5,422,766 A | | 6/1995 | Hack |
| 5,454,157 A | | 10/1995 | Ananth |
| 5,559,382 A | * | 9/1996 | Oku et al. ..................... 310/90 |
| 5,671,103 A | | 9/1997 | Tada |
| 5,696,648 A | | 12/1997 | Jeong |
| 5,791,784 A | * | 8/1998 | Ichiyama ..................... 384/107 |
| 6,078,475 A | * | 6/2000 | Lawson ................... 360/265.2 |
| 6,144,178 A | | 11/2000 | Hirano |
| 6,178,059 B1 | | 1/2001 | Frees |
| 6,317,286 B1 | | 11/2001 | Murphy |
| 6,373,654 B1 | | 4/2002 | Iwahara |
| 6,392,838 B1 | | 5/2002 | Hearn |
| 6,411,471 B1 | * | 6/2002 | Liu et al. ................. 360/265.2 |
| 6,430,000 B1 | | 8/2002 | Rent |
| 6,525,899 B2 | | 2/2003 | Hearn |
| 2002/0044376 A1 | | 4/2002 | Serizawa |
| 2002/0089782 A1 | | 7/2002 | Hearn |
| 2002/0114104 A1 | | 8/2002 | Hearn |
| 2002/0153672 A1 | | 10/2002 | Caplain |

\* cited by examiner

*Primary Examiner*—George J. Letscher
(74) *Attorney, Agent, or Firm*—Fellers, Snider, et al.

(57) ABSTRACT

A hermetically sealed housing such as for use in a data storage device. Opposing first and second housing members are coupled together with respective interior surfaces in facing relationship to form a hermetically sealed interior environment. An internally mounted shaft includes a medial portion about which a rotatable article rotates, a proximal end internally supported by the first housing member, and a distal end internally supported by the second housing member. In some embodiments, at least one of the proximal and distal ends fits into a corresponding recess formed in the respective housing member. In other embodiments, at least one of the proximal and distal ends includes a cup-shaped recess which accommodates a pin that projects from the respective housing member. Layers of compliant material are preferably provided at the interfaces between the ends of the shaft and the respective housing members.

21 Claims, 10 Drawing Sheets

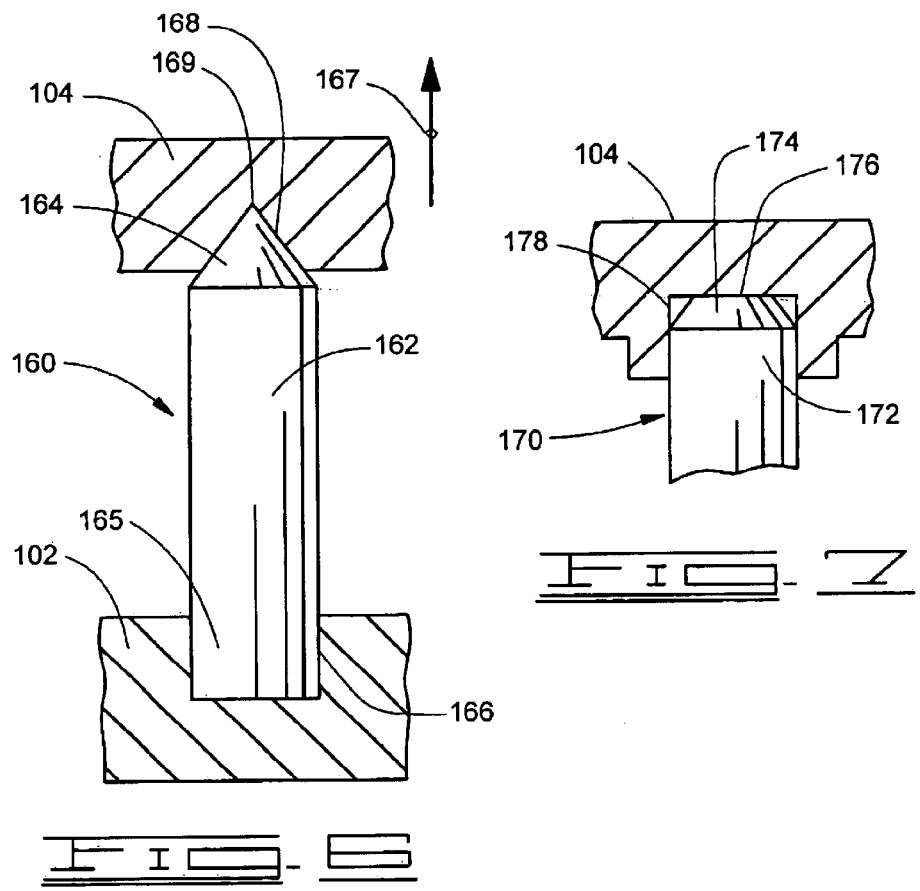
FIG. 6
FIG. 7
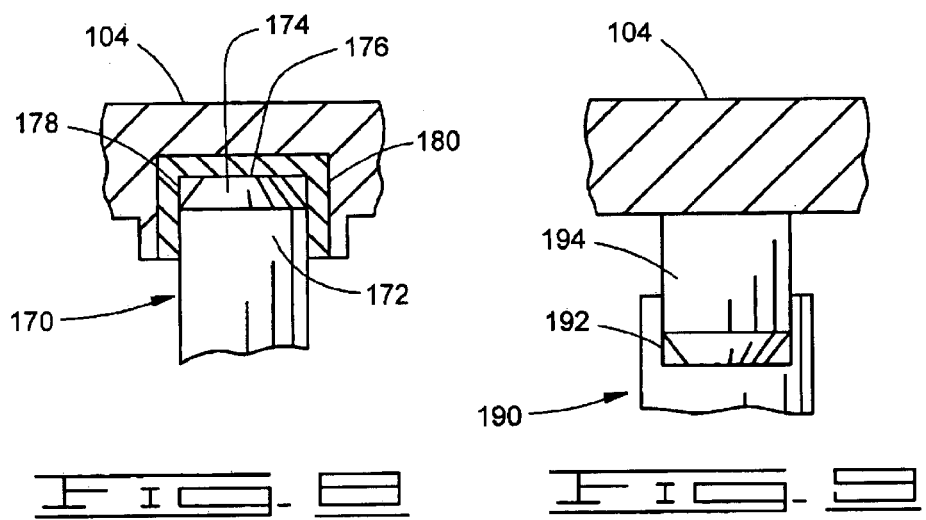
FIG. 8
FIG. 9

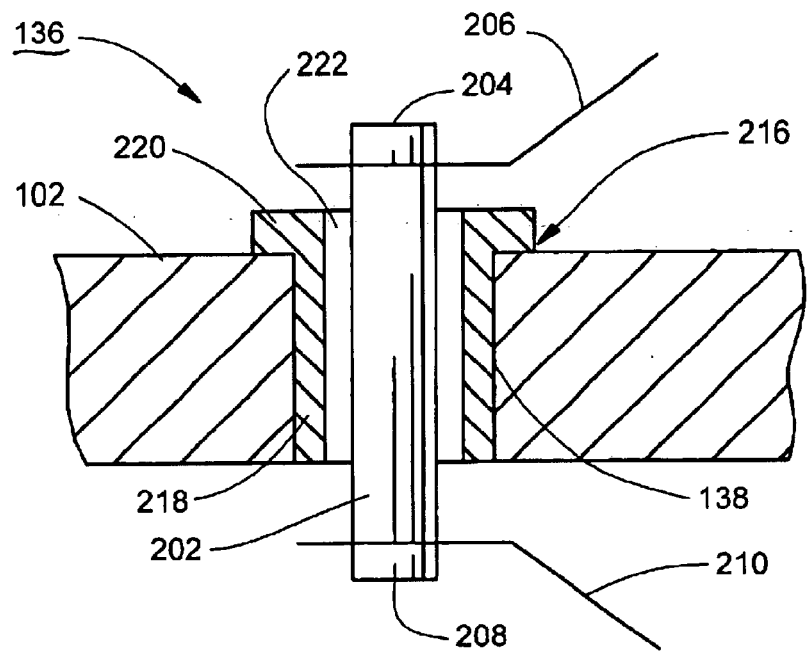
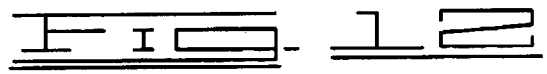
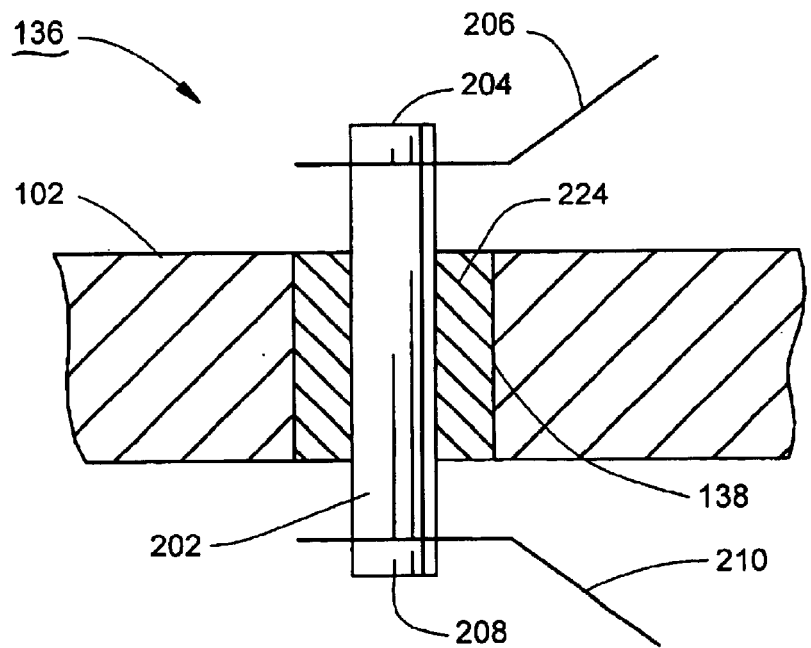
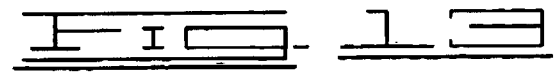

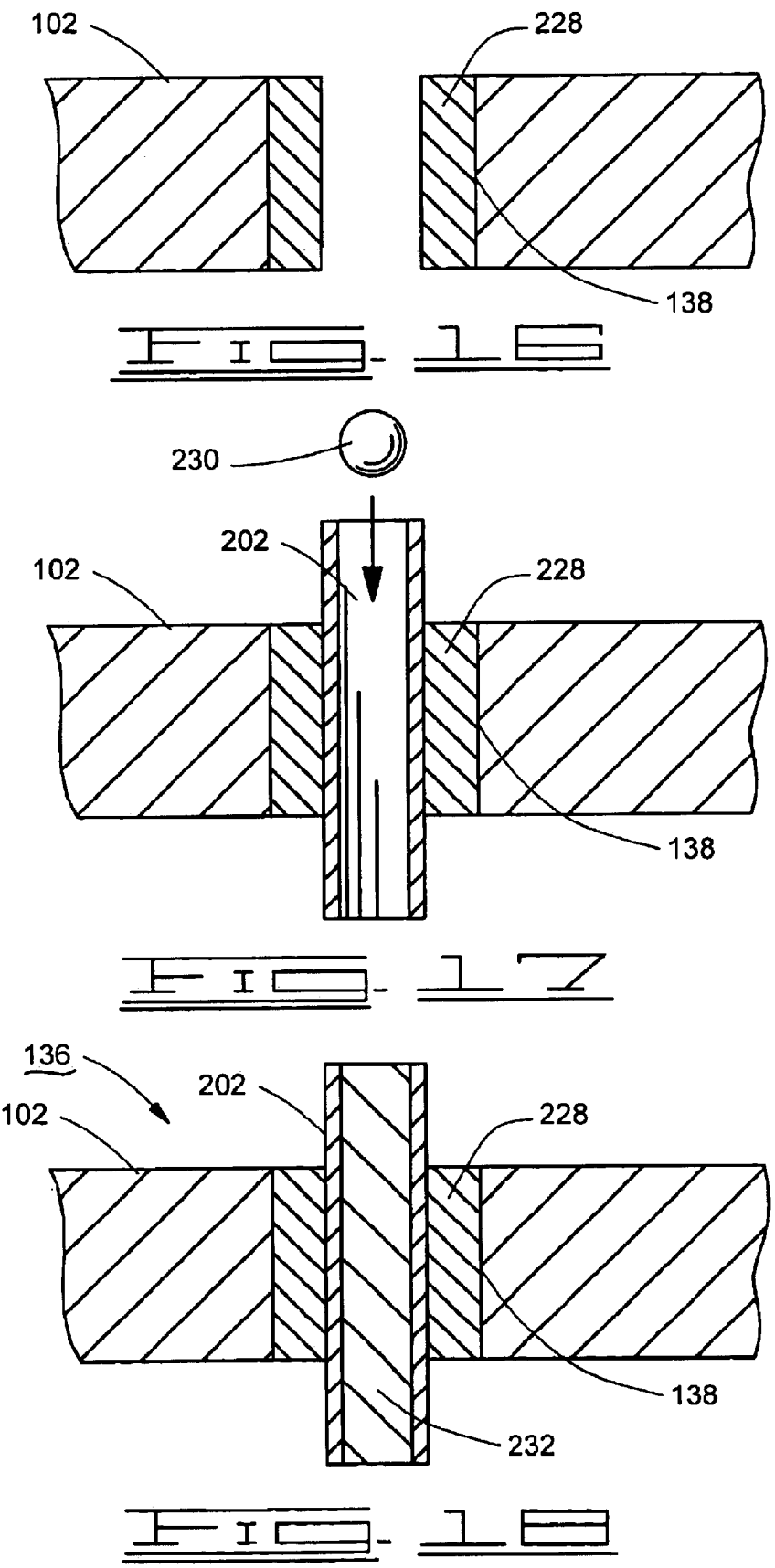

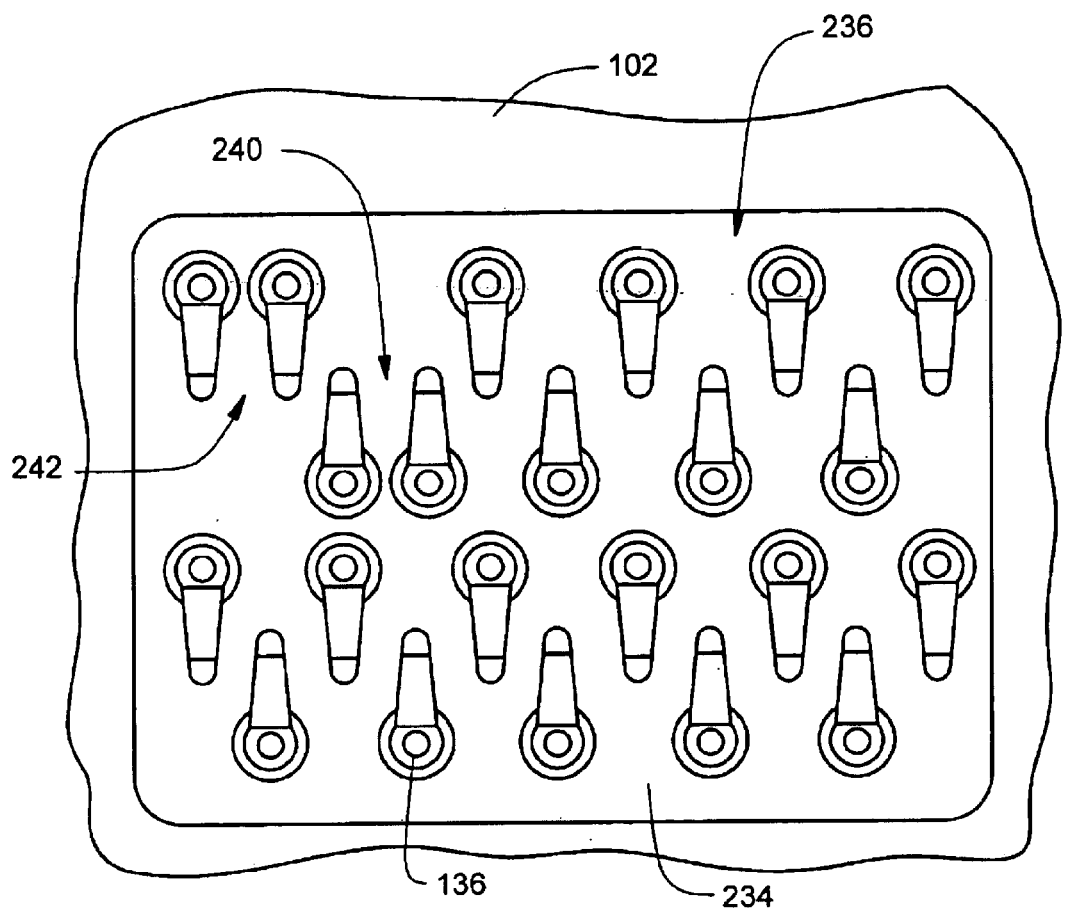
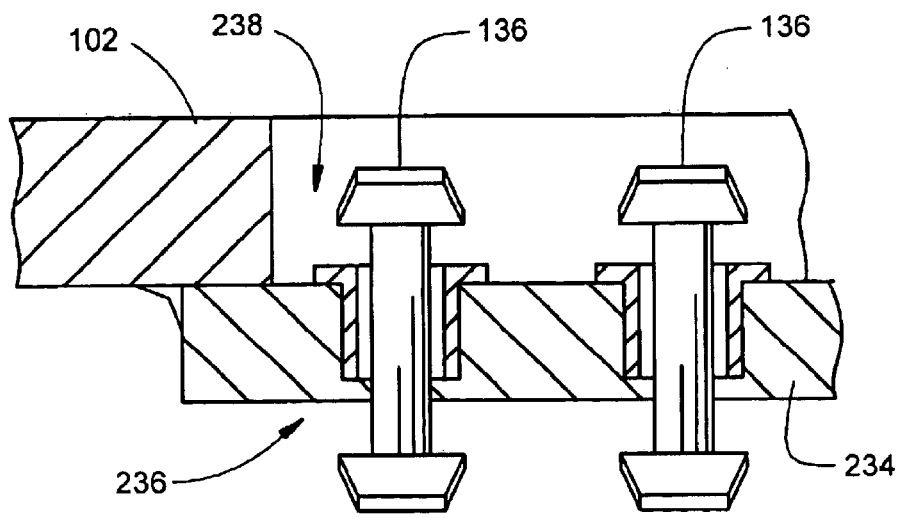
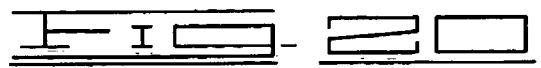

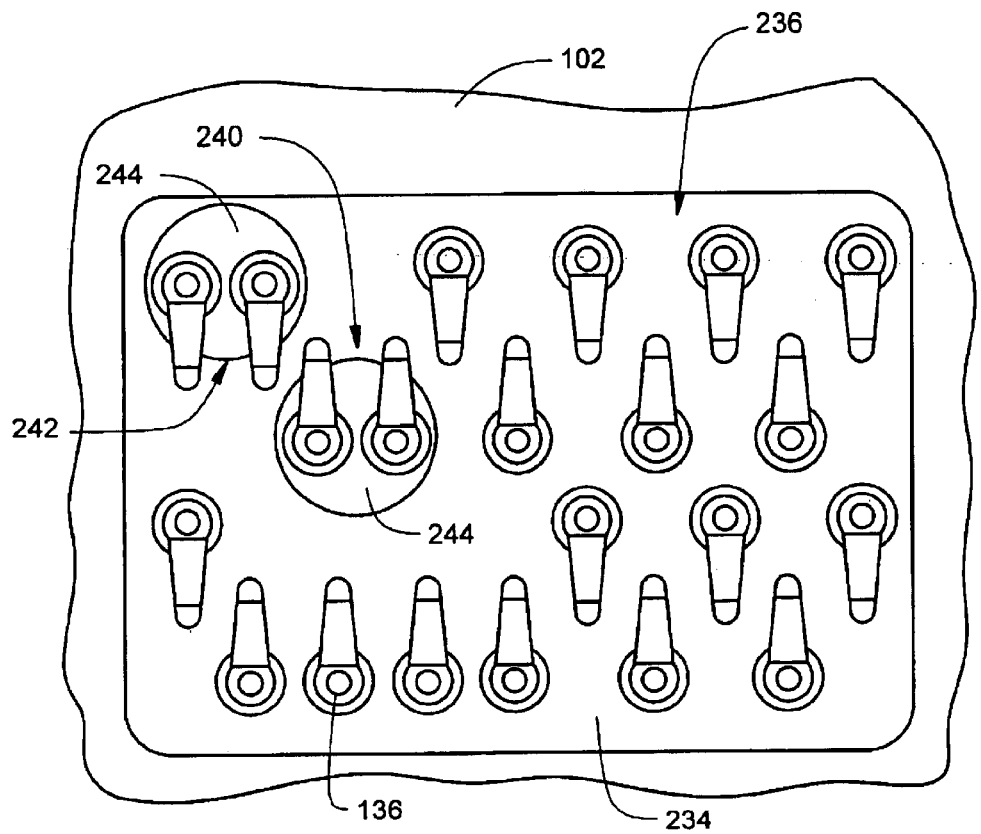
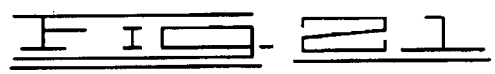
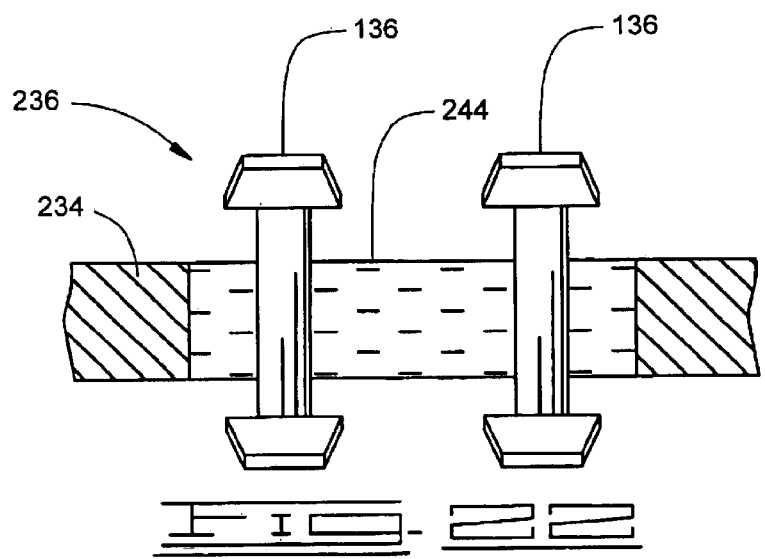

INTERNAL SUPPORT MEMBER IN A HERMETICALLY SEALED DATA STORAGE DEVICE

RELATED APPLICATIONS

The present application claims benefit of U.S. Provisional Application No. 60/448,229, filed Feb. 19, 2003 and is related to copending U.S. patent application Ser. No. 10/782,294 entitled Hermetically Sealed Data Storage Device, and to copending U.S. patent application Ser. No. 10/782,295 entitled Electrical Feedthrough in a Hermetically Sealed Data Storage Device, both filed concurrently herewith.

FIELD OF THE INVENTION

The claimed invention relates generally to the field of data storage devices and more particularly, but not by way of limitation, to supporting a member within a hermetically sealed data storage device housing.

BACKGROUND

Disc drives are digital data storage devices which store and retrieve large amounts of user data in a fast and efficient manner. The data are magnetically recorded on the surfaces of one or more data storage discs (media) affixed to a spindle motor for rotation at a constant high speed.

An array of vertically aligned data transducing heads are controllably positioned by an actuator to read data from and write data to tracks defined on the recording surfaces. An actuator motor rotates the actuator to move the heads across the disc surfaces. The heads are configured to be aerodynamically supported over these surfaces by fluidic pressures (e.g., air, helium, etc.) established by the high speed rotation of the discs.

It is generally desirable to control the fluidic environment within a data storage device. Data storage housings are typically sealed with gaskets and similar features along the respective housing mating surfaces to prevent the ingress of contaminants from the external environment.

Some designers have provided hermetically sealed devices so that the interior atmosphere within the device is completely captured and no fluidic transfer is allowed to occur between the interior and exterior of the housing. A hermetically sealed housing allows the use of a lower density fluid within the housing, such as an inert gas (e.g., helium). This can provide certain operational performance advantages including lower head fly heights, reduced non-repeatable runout (NRRO) effects, and higher data recording densities. A hermetically sealed housing can also reduce corrosion of internal components and contamination from external particles.

There is accordingly a need for improvements in hermetically sealed housings such as the types used for data storage devices, and it is to such improvements that the claimed invention is generally directed.

SUMMARY OF THE INVENTION

In accordance with preferred embodiments, a hermetically sealed housing is provided such as for use in a data storage device.

The housing is provided with a pair of opposing, substantially planar first and second housing members which are coupled together to form a hermetically sealed interior environment. An internally mounted shaft is provided with a medial portion which supports an article rotatable within the interior environment. When the housing is characterized as a data storage device housing, the rotatable article can comprise a spindle motor which supports one or more magnetic recording discs or a rotary actuator which supports one or more data transducing heads.

The shaft further has a proximal end supported by the first housing member, and a distal end opposite the proximal end which is supported by the second housing member.

In some embodiments, the distal end is supported by an exterior surface on the distal end of the shaft which mates with an interior recess in the second housing member. The exterior surface of the shaft, which is preferably tapered, is guided into and retained by the recess when the second housing member is brought into alignment with the first housing member.

In other embodiments, the distal end is supported by a recess which extends into the distal end of the shaft and a pin which is affixed to and projects away from the second housing member, wherein the pin is guided into and retained by the recess when the second housing member is brought into alignment with the first housing member.

Preferably, a layer of compliant material is sandwiched between the shaft and the second housing member to accommodate manufacturing tolerances and ensure a solid support of the distal end of the shaft. Alternatively, a localized region of the second housing member is provided with a desired amount of compliance, such as by localized thinning of the wall thickness, to accommodate such manufacturing tolerances and ensure solid support of the shaft.

The foregoing various embodiments provide continuous layers of the materials forming the respective housing members between the shaft and the exterior environment, thus internally supporting the shaft wholly within the housing and eliminating apertures or other leakage paths through the housing walls. This aids in ensuring that the hermetically sealed internal atmosphere remains captured within the interior environment of the housing during the operational life thereof.

These and various other features and advantages which characterize the claimed invention will become apparent upon reading the following detailed description and upon reviewing the associated drawings.

BRIEF DESCRIPTION OF THE DRAWINGS

FIG. 5-1 provides an elevational, cross-sectional view of the housing in accordance with yet another alternative embodiment.

FIGS. 6–9 provide various alternative embodiments of an interior shaft capture arrangement used to secure shafts about which an actuator and/or a spindle motor of the device of FIG. 1 rotate.

FIG. 12 shows the feedthrough of FIG. 11 nested within the corresponding aperture in the base deck.

FIG. 13 illustrates an alternative embodiment for the feedthrough of FIG. 11 in which the feedthrough is formed using an injection-molding process.

FIGS. 16–18 illustrate the use of a swaging process to complete the formation of the feedthrough.

FIGS. 19–20 illustrate another embodiment in which multiple feedthroughs are initially affixed to an insertion member and the insertion member is then affixed over an aperture in the housing.

FIGS. 21–22 illustrate an alternative embodiment to that shown in FIGS. 19–20 in which differential pairs of the feedthroughs are isolated in glass discs within the insertion member.

DETAILED DESCRIPTION

Figure 1:
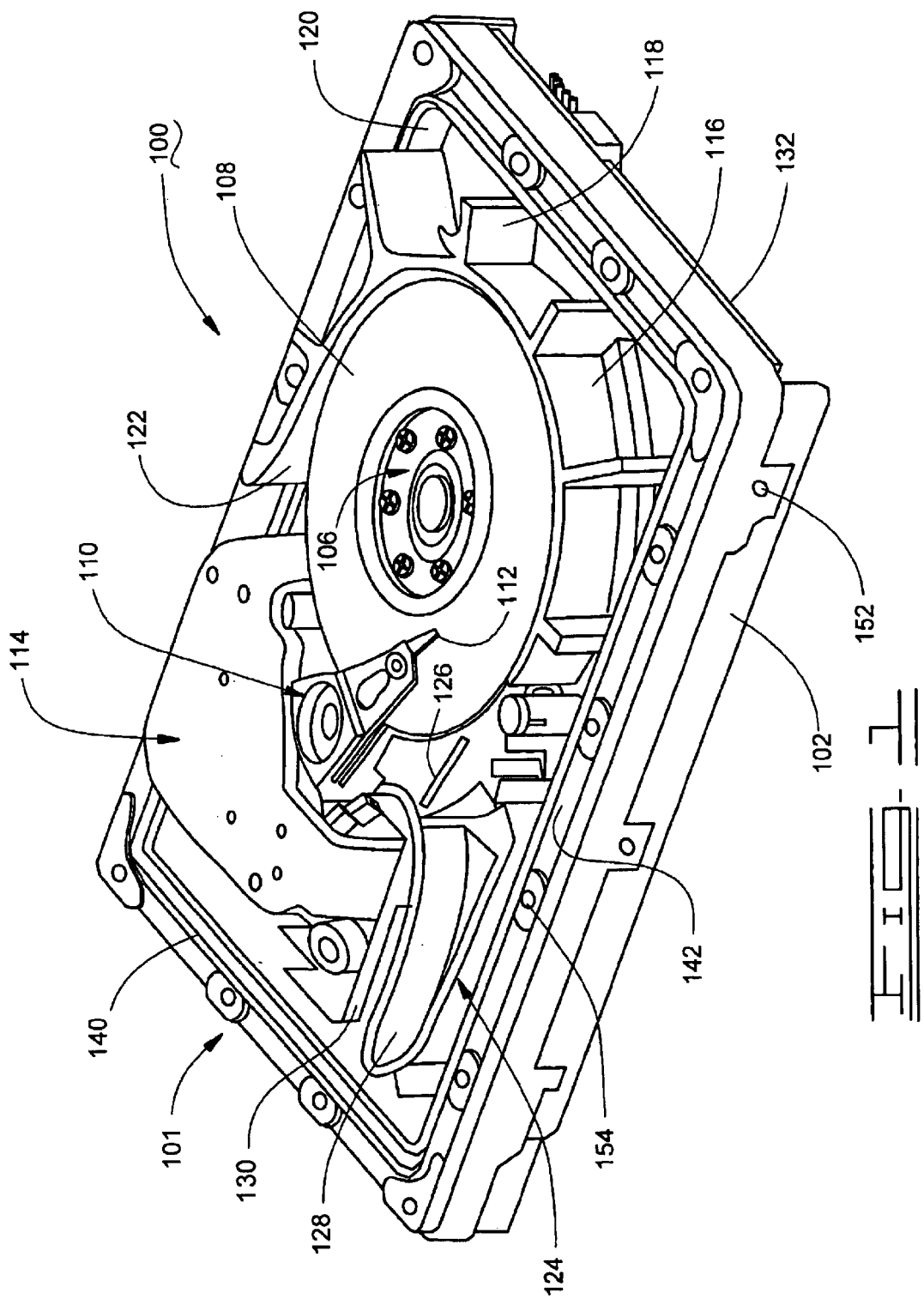
FIG. 1 is an isometric view of a data storage device constructed in accordance with preferred embodiments of the present invention, the device having a clamshell housing with a top cover which is removed in FIG. 1 to reveal an interior construction of the device.

FIG. 1 provides a top plan view of a data storage device constructed in accordance with preferred embodiments of the present invention. The data storage device is preferably characterized as a disc drive 100 of the type which magnetically stores and retrieves digital data from and to a host computer device.

Figure 2:
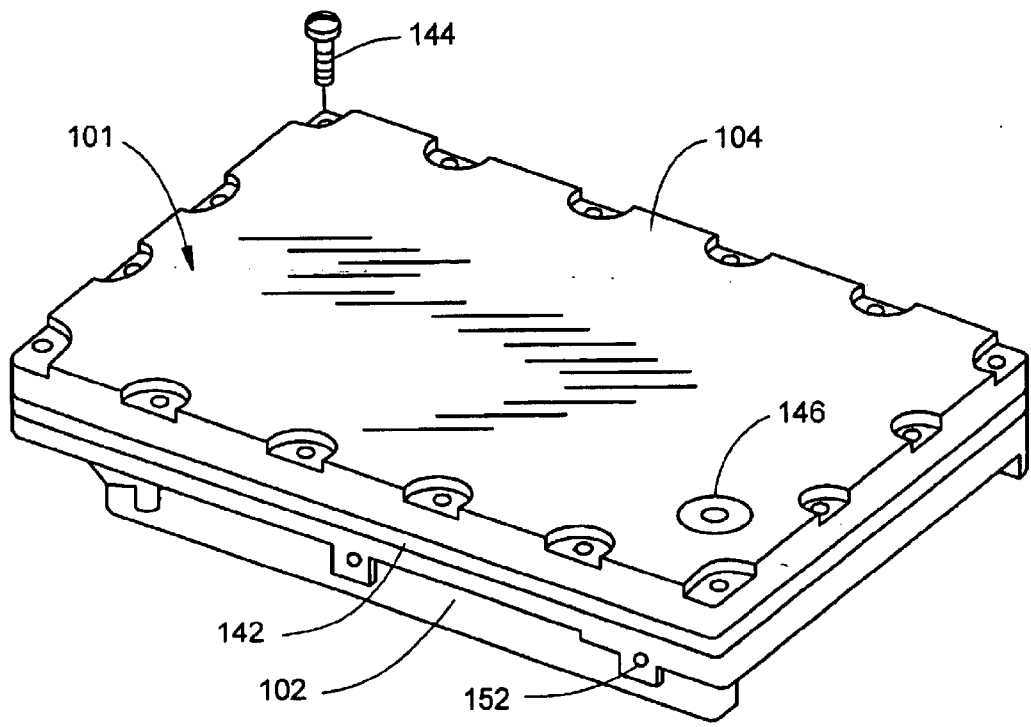
FIG. 2 provides an isometric view of the data storage device housing of FIG. 1 with the top cover in place.
Figure 3:
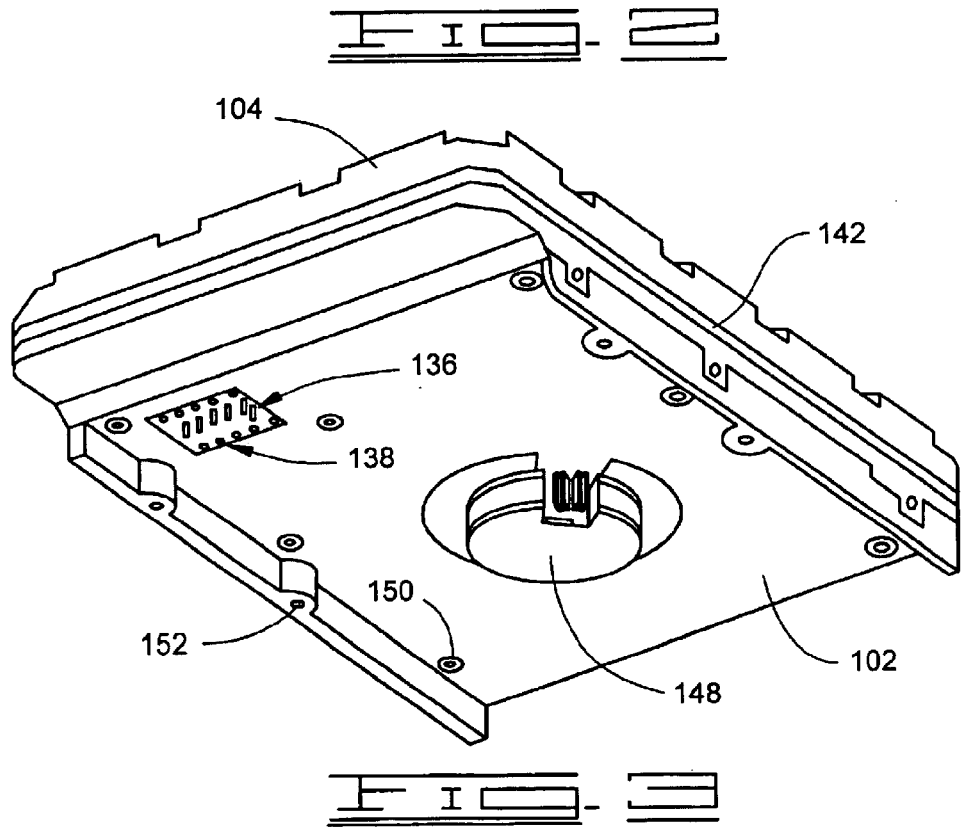
FIG. 3 provides another isometric view of the data storage device housing of FIGS. 1 and 2.

The disc drive 100 includes an enclosed housing 101 which defines an internal environment for the drive. The housing 101 is preferably characterized as a clamshell-type housing formed by a pair of substantially planar housing members including a base deck 102 and a top cover. The top cover has been removed in FIG. 1 to reveal the interior of the housing 101, but is shown at 104 in the isometric views of the housing provided in FIGS. 2 and 3.

The housing 101 is configured to establish a hermetic seal against the exterior environment outside the device 100. Preferably, the housing 101 is supplied with an inert fluidic atmosphere (e.g., helium) at a selected atmospheric pressure, such as standard atmospheric pressure, or pressures above or below standard atmospheric pressure. The hermetic seal established by the housing 101 is configured to nominally retain the internally contained fluid for the operational life of the device 100.

Continuing with FIG. 1, the base deck 102 supports a spindle motor 106 which rotates a plurality of data storage discs 108 at a constant high speed. A rotary actuator 110 supports a number of data transducing heads 112 adjacent the disc surfaces. The actuator 110 is rotated by an actuator motor 114, preferably characterized as a voice coil motor, VCM.

A shroud member 116 projects upwardly from the base deck 102 and partially surrounds the discs 108 to provide shrouding and containment of fluidic currents established by the rotation of the discs 108. The shroud member 116 includes radially projecting ribs 118 which serve to strengthen the shroud member 116, as well as allow a larger volume of fluid to be retained within the housing 101 in the space between the member 116 and a vertical sidewall 120 of the base deck 102.

A diverting surface 122 of the shroud 116 directs a portion of the recirculating fluidic currents from the discs 108 to the actuator motor 114 to convectively cool the motor. A plenum assembly 124 channels fluidic currents through a pass-through recirculation filter (housed within slot 126) and further accommodates a relatively large block of adsorbent filtering material (not shown) in recess 128.

A flex circuit assembly 130 provides electrical communication paths between the actuator 110 and a printed circuit board (PCB) 132. The PCB 132 is mounted to an exterior surface 134 (FIG. 3) of the base deck 102 and supports communication and control electronics for the device 100.

Individual feedthrough connectors (four represented at 136 in FIG. 3) are disposed within precisely sized apertures (represented at 138 in FIG. 3) in the base deck to accommodate electrical connection between the flex circuit assembly 130 and the PCB 132. Similar feedthrough connectors are provided to facilitate electrical interconnection between the spindle motor 106 and the PCB 132. For reference, it is contemplated that three (3) such feedthrough connectors are used for the spindle motor 106 and twenty-two (22) such connectors are used for the flex circuit assembly 130.

A compressive metal gasket seal 140 extends along the interior sidewall 120 of the base deck 102. An essentially non-compressive seal retention ring 142 preferably surrounds the seal 140 and is interposed between the base deck 102 and top cover 104. A plurality of fasteners (one shown at 144 in FIG. 2) are used to secure the base deck 102, top cover 104 and ring 142 together to complete the housing 101.

A purge/fill valve 146 extends into the top cover (FIG. 2) to allow evacuation of an existing volume of fluid (e.g., atmospheric air) and replacement with a new volume of fluid (e.g., helium). The valve 146 can be sealed by an internal mechanism or by the addition of an external seal using a conventional sealing process. A spindle motor boss 148 (FIG. 3) projects downwardly from the base deck 102 to provide clearance for the internally mounted spindle motor 106.

Threaded apertures (one shown at 150 in FIG. 3) accommodate hardware (not shown) used to mount the PCB 132 to the underside of the base deck 102. Similarly, threaded apertures 152 are provided to accommodate fasteners used to mount the device 100 in an operational environment.

Having now concluded an overview of the device 100, preferred embodiments of various aspects of the device will now be discussed in turn.

Housing Seal

As mentioned above, the housing 101 is contemplated as providing a nominally complete hermetic seal for the operational life of the device 100. To this end, the gasket seal 140 is preferably made of a suitable compliant material, such as dead soft aluminum, that improves sealing by filling in any residual surface roughness of the mating surfaces. The seal 140 can also include a thin coating layer (not separately shown) of a relatively soft metal such as lead, tin, gold, etc. to further enhance filling at the housing/seal junctions.

Figures 1, 4, 5:
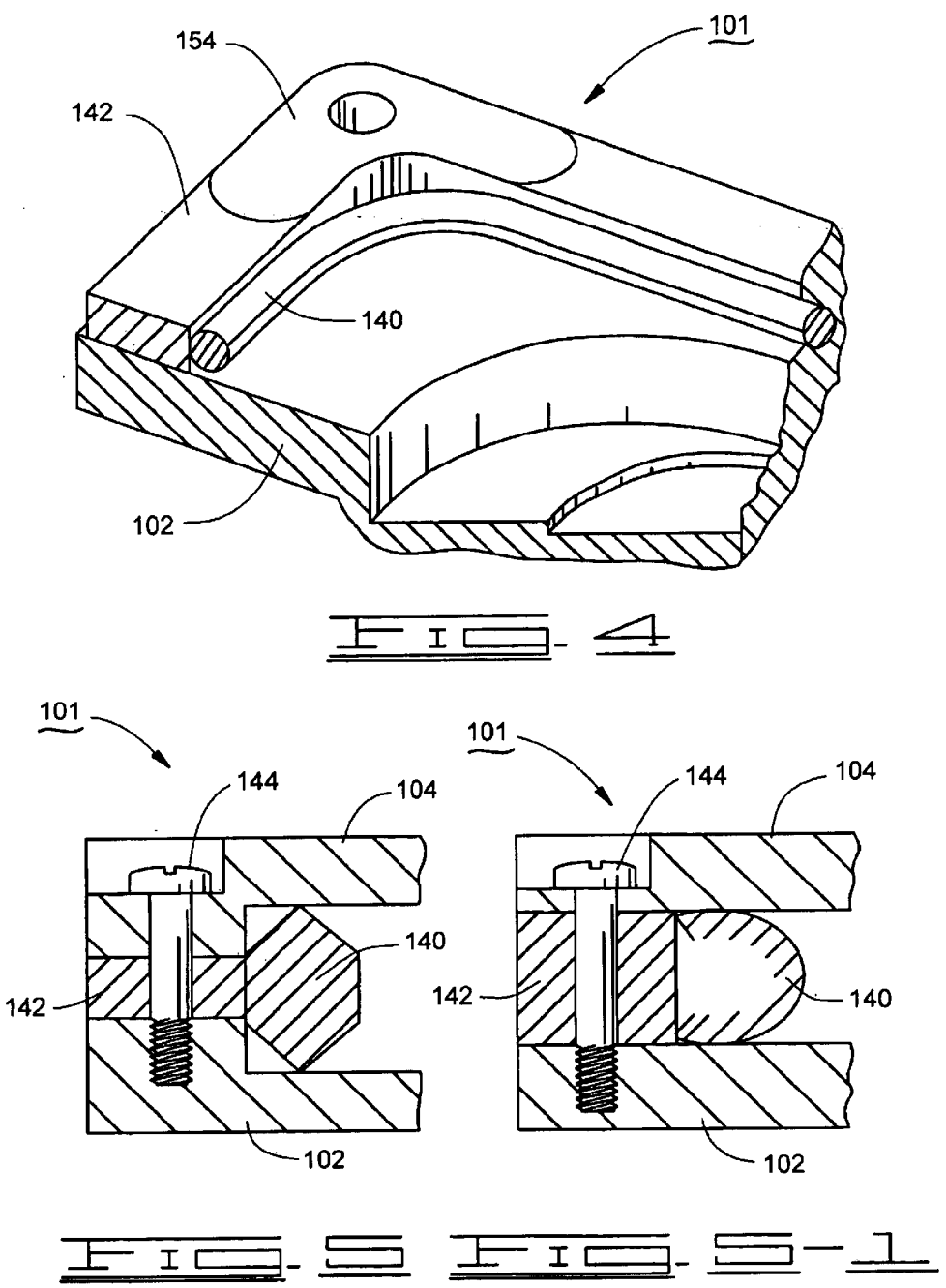
FIG. 4 provides an isometric, partial cut-away view of the housing of FIGS. 2 and 3.
FIG. 5 provides an elevational, cross-sectional view of the housing in accordance with an alternative embodiment.

In one preferred configuration, the seal 140 has a hexagonal, "double-diamond" cross-sectional shape as depicted in FIGS. 4 and 5. A suitable commercial source for the double-diamond seal material shown in FIGS. 4 and 5 is EVAC International, Inc., Elk Grove Village, Ill., U.S.A.

The seal 140 can take alternative configurations as well, including a c-shaped cross-section as depicted in FIG. 5-1. A suitable commercial source for the c-shaped seal material shown in FIG. 5-1 is PerkinElmer, Inc., Hooksett, N.H., U.S.A.

The base deck 102, top cover 104 and the ring 142 are made of a material with substantially the same coefficient of thermal expansion (e.g., aluminum, aluminum alloy, etc.) as the seal 140. Preferably, the seal 140 contactingly nests within and is supported by the seal ring 142 as shown in FIGS. 5 and 5-1.

The number and spacing of the perimeter fasteners 144 (FIG. 2) are selected to provide a substantially even load upon the seal 140. The combination of residual elastic load in the metal seal and the matching coefficients of thermal expansion will enable the housing 101 to remain sufficiently hermetic through numerous thermal cycles within the non-operating and operating temperature ranges specified for the device 100.

The seal retention ring 142, also referred to as a compression limit spacer, is generally constructed to provide a compression limit for the seal 140. That is, as the fasteners 144 are torqued into place, the ring 142 limits the final compressive state of the seal 140 to a predetermined level. Machined bosses 154 (best viewed in FIG. 1) on the ring 142 are precisely dimensioned and distributed around the periphery of the housing 101 so as to surround the junctions between the top cover 104 and base deck 102. The use of the bosses 154 advantageously reduces the total surface area that needs be precisely machined to meet the compression limit dimensions.

The ring 142 can be provided with an overall thickness that is slightly less than the overall thickness of the gasket 140, as depicted in FIGS. 4 and 5-1, or the combined thickness of sidewalls of the top cover 104, base deck 102 and the retention ring 142 can be selected to be slightly less than the overall thickness of the gasket 140, as depicted in FIG. 5.

An advantage of the use of the removeable ring 142 is the ability to provide different sets of rings 142 and/or seals 140 with different overall thicknesses. This allows the use of the same seals 140 in different housing applications due to the different "spacer" dimensions of the different rings 142. Component matching and sorting can also be carried out as necessary to obtain appropriate seal/ring pairs based on tolerance requirements.

The removeable rings 142 also facilitates manufacturability of the device 100; for example, a "standard" thickness ring 142 can be installed initially into the device 100 during manufacturing. Should it be necessary to subsequently open the device 100, a second, thinner ring 142 can be installed that provides different, closer compression limit dimensions for the previously compressed seal 140. In this way, the original seal 140 can be reused in the same device 100 after the housing 101 has been opened. This can be valuable if the relative costs of the seal 140 and the "thinner" ring 142 make it more cost effective to reuse rather than replace the seal.

Actuator and Spindle Motor Shaft Support

Generally, it has been found desirable in some applications to provide top and bottom support of shafts used to support actuators and spindle motors (such as 110, 106 in FIG. 1). Supporting the shafts in this manner can reduce the generation of undesired vibrations during operation.

Previous generation devices have sometimes utilized fasteners that extend through apertures in the top cover to respectively secure stationary actuator and spindle motor shafts to the top cover. As will be recognized, such apertures represent possible leakage and contaminant entry paths.

Accordingly, preferred embodiments of the present invention utilize a top cover shaft capture arrangement, as variously illustrated in FIGS. 6–9. In accordance with a first embodiment, FIG. 6 provides a shaft 160 about which the actuator 110 (FIG. 1) or a rotatable hub of the spindle motor 106 can be configured to rotate. The shaft 160 has a substantially cylindrical outer surface 162 and a cone-shaped, tapered distal end 164.

A proximal end 165 of the shaft 160 is press-fit into an associated recess 166 in the base deck 102. The tapered distal end 164 engages a correspondingly tapered recess 168 in the top cover. The recess 168 is shaped to guide the end 164 into a distal recess point 169.

The top cover 104 is preferably made to be sufficiently compliant in this area so as to achieve the desired mechanical capturing of the shaft 160 between the respective base deck 102 and top cover 104. The nominally flat top cover 104 can thus be slightly bowed upwardly in the locality of the shaft 160 when the top cover 104 is installed, as generally represented by arrow 167.

FIG. 7 provides an alternative shaft 170 with a cylindrical outer surface 172 and a chamfered distal surface 174 that tapers to a planar surface 176. A generally cup-shaped recess 178 receives the distal end of the shaft 170. As shown in FIG. 8, the cup-shaped recess 178 can further be supplied with a layer of compliant material 180 that compresses upon insertion of the shaft 170 into the recess 178.

It is not necessarily required that the shaft be inserted into the top cover 102. Rather, as illustrated by FIG. 9, a shaft 190 can be provided with a recess 192 that accommodates insertion of a pin 194 that projects downwardly from the top cover 102. As before, a layer of compliant material (such as 180 in FIG. 8) can be additionally provided in the recess 192, or on the pin 194.

It will be noted that the embodiments represented by FIGS. 6–9 support the distal end of the shaft within the interior environment of the housing 101, unlike the prior art methodologies mentioned above wherein fasteners or other members project through the thickness of one or both housing members and thus present a potential leakage path. Moreover, the embodiments of FIGS. 6–9 are not limited to the top cover 104; rather, the same or similar methodologies can readily be used to affix the respective shafts to the base deck 102 as well, as desired.

Electrical Feedthroughs

Figure 10:
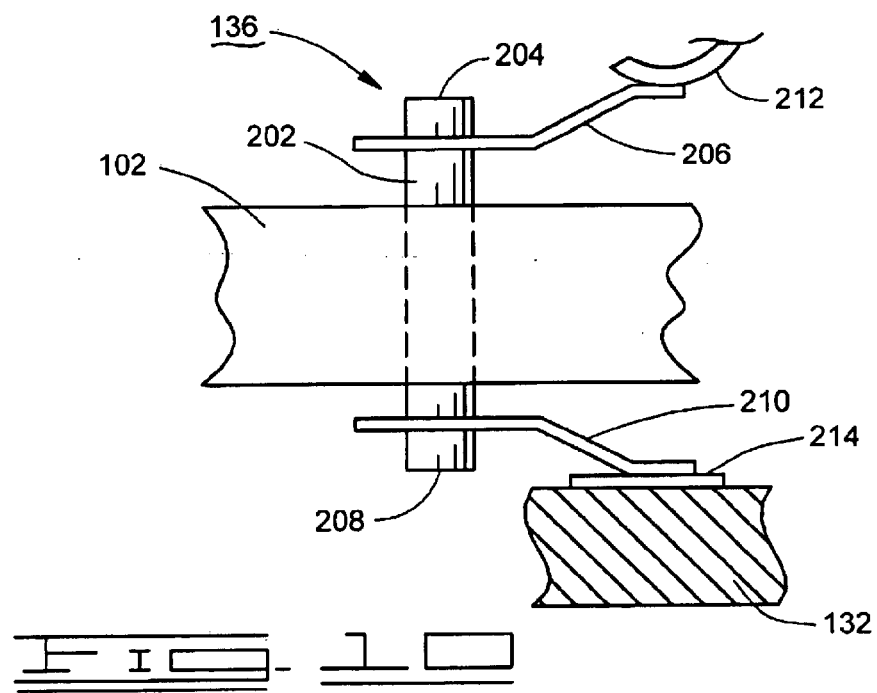
FIG. 10 is a schematic diagram of an electrical feedthrough used to provide an electrical conduction path from the interior of the housing to an exterior environment.

As mentioned above, the device 100 preferably utilizes a number of individual feedthrough connectors 136 ("feedthroughs") to allow electrical interconnection of the PCB 132 outside the housing 101 with the flex circuit assembly 130 and spindle motor 106 within the housing. A simplified schematic representation of one of the feedthroughs 136 is provided in FIG. 10.

Each feedthrough 136 preferably comprises a rigid, vertically extending conductive pin 202 which is supported by and electrically isolated from the base deck 102. A proximal end 204 of the pin 202 projects into the interior of the housing 101 and supports a cantilevered, leaf spring contact 206. A distal end 208 of the pin 202 projects beyond the exterior of the housing 101 and supports a second cantilevered, leaf spring contact 210.

The contacts 206, 210 are rigidly affixed to the pin 202, preferably via a press-fit, soldering or welding operation. The contacts 206, 210 each preferably project away from the base deck 102 as shown and facilitate the use of a compression contact connection. For example, the interior pin 206 is shown to pressingly engage a leaf spring contact 212 coupled to the flex circuit assembly 130. The exterior pin 210 pressingly engages a conductive pad 214 on the PCB 132. It will be understood that various other configurations for the cantilevered spring contacts 206, 210 and other engagement methodologies are readily contemplated and can be incorporated as desired depending upon the requirements of a given application.

Figure 11:
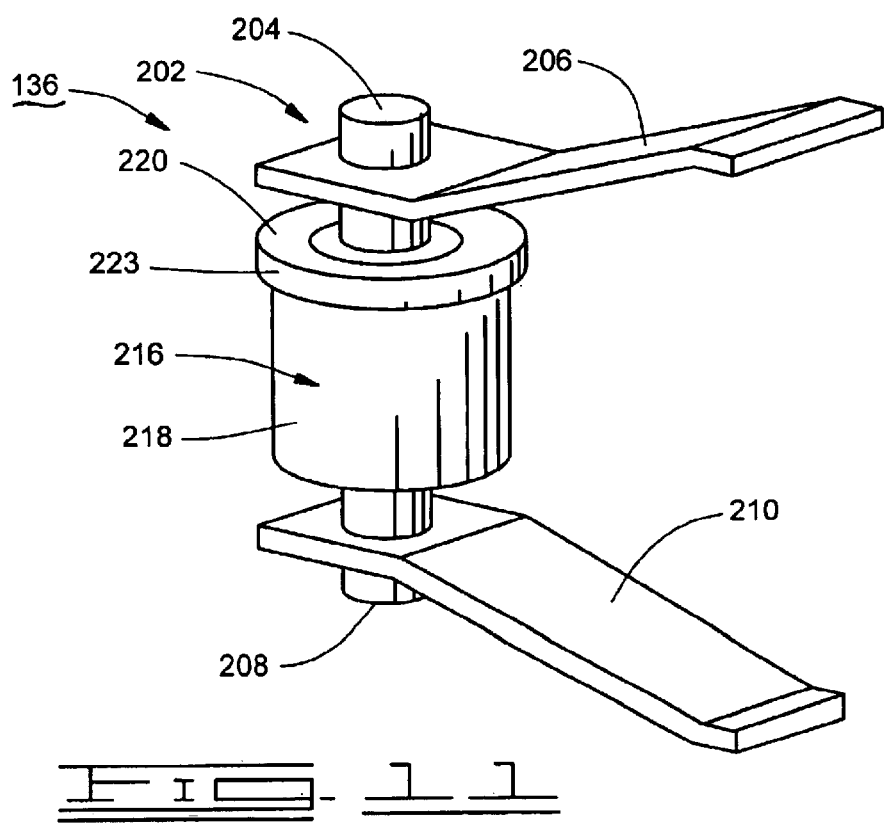
FIG. 11 provides an isometric view of the feedthrough in accordance with a preferred embodiment.

Various embodiments for the feedthroughs 136 will now be discussed. FIG. 11 shows a first version comprising a preformed insulation structure 216 affixed to a medial portion of the pin 202. As further shown in FIG. 12, the insulation structure 216 nests within the corresponding through-hole aperture 138 in the base deck and includes an outer cylindrical conductive tube 218 with a radially projecting hat flange 220.

An interior, insulating, low permeable glass layer 222 is disposed between the pin 202 and the tube 218. A soldering, brazing or welding operation is used to attach and hermetically seal the structure 216 over the aperture 138. A suitable commercial source for the structure 216 is Thunder-Z Corporation, Hampstead, N.H., U.S.A.

The hat flange 220 provides a suitable surface area to permit the attachment of the structure 216 to the base deck 102 such as, for example, by a welding or solder seam along outer surface 223. The hat flange 220 further advantageously acts as a limit stop; that is, the feedthrough 136 is inserted downwardly into the aperture 138 until the flange 220 comes to rest upon the top surface of the base deck 102. The spring contacts 206, 210 can be attached to the pin 202 prior to insertion, or can be attached after the structure 216 is affixed in the aperture 138.

It will be apparent that the configuration and orientation of the cantilevered leaf-spring contacts 206, 210 can be readily modified to permit easy insertion of the assembled feedthrough 136 through the confines of the aperture 138. For example, the contacts 206, 210 can be configured to be nominally oriented along the axial length of the pin 202 and thereafter be "folded-down" to the general orientation shown in FIGS. 10–12. Moreover, the contacts 206, 210 need not necessarily be discrete parts that are affixed to the pin 202; rather, in alternative embodiments the contacts can comprise tabs or similar extensions that project from the pin 202.

Another embodiment for the feedthroughs 136 is provided in FIG. 13. In this embodiment the individual pins 202 are initially held within the corresponding apertures 138 and then molded in-place using an injection-moldable, low permeable material 224 such as a suitable elastomer or polyimide. As before, the contacts 206, 210 are preferably part of the pins 202 or attached to the pins 202 prior to this molding step, but can alternatively be attached afterwards.

Figure 14:
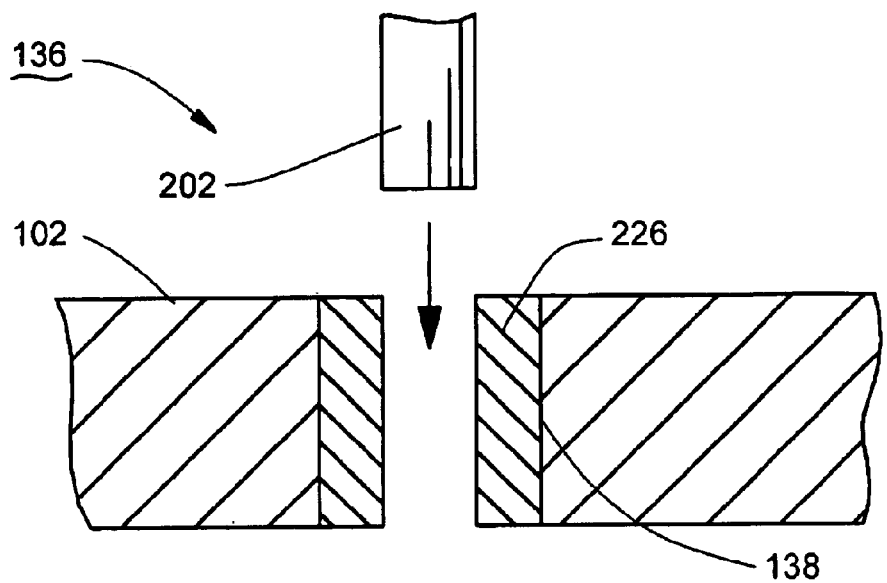
FIGS. 14 and 15 illustrate the use of thermal shrinking to insert a pin of the feedthrough into the base deck.
Figure 15:
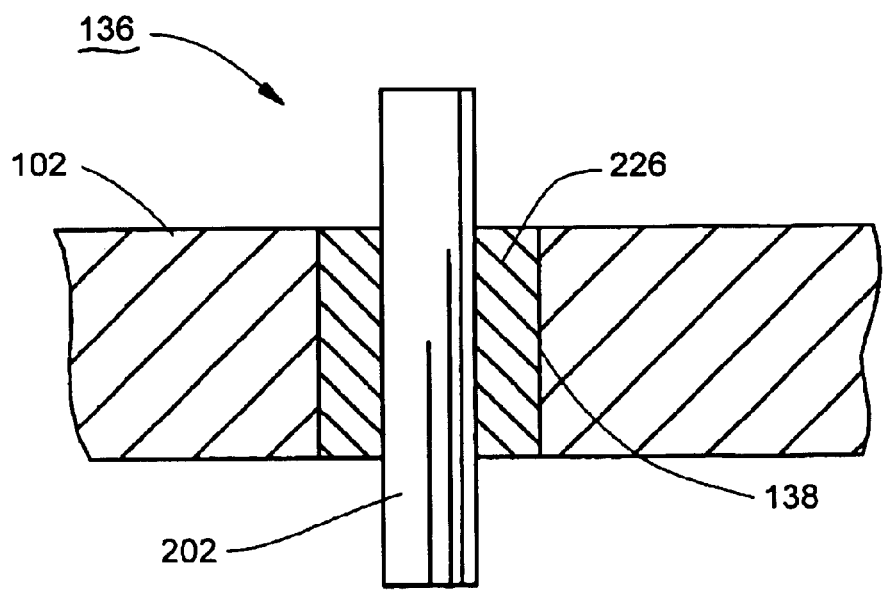

FIGS. 14 and 15 generally illustrate yet another embodiment for the feedthroughs 136. In this embodiment a ring of low permeable material 226 is molded or otherwise inserted into the aperture 138. The pin 202 (with or without the contacts 206, 210) is subjected to a significant decrease in temperature (utilizing a liquid nitrogen or similar heat sinking process) to temporarily, thermally shrink the dimensions of the pin 202 (as depicted in FIG. 14).

While in this thermally shrunk state, the pin 202 is inserted into the material 226 (as depicted in FIG. 15). As the pin 202 returns to ambient temperature, the outward expansion of the pin 202 forms a hermetic seal against the material 226.

The compositions of the pin 202 and material 226 should be matched so that the dimensional range of the pin 202 between the low temperature and ambient states can be accommodated structurally by the material 226, and that a suitable hermetic seal is obtained at the material/pin boundary at the conclusion of the thermal-shrink operation.

FIGS. 16–18 illustrate yet another embodiment for the feedthroughs 136. In this embodiment, a swaging operation is used to affix the feedthrough 136 into the aperture 138.

A ring of low permeable material 228 is molded or otherwise inserted into the aperture 138, as shown in FIG. 16. The pin 202 is configured as a hollow, cylindrical tube sized to nominally slide into the ring of material 228, FIG. 17. A swaging ball or similar member 230 is passed through the length of the tube to outwardly deform the pin 202 to form a hermetic seal at the material/pin boundary. The tube is then filled with solder 232 or other suitable material (FIG. 18) to complete the operation. As before, the contacts 206, 210 can be extensions of the pin 202 or separate parts that are affixed to the pin before or after the swaging operation.

The foregoing various embodiments of the feedthroughs 136 can be assembled directly into the base deck 102 (or top cover 104) to provide the requisite feedthrough array. In an alternative approach, the feedthroughs 136 are initially affixed through a separate insertion member, such as plate 234 shown in FIGS. 19–20, to provide a prefabricated feedthrough assembly 236. The feedthrough assembly 236 is then installed over an aperture 238 in the base deck 102 using a suitable attachment methodology, such as laser welding.

The feedthroughs 136 can be arranged into any suitable pattern, and can include adjacent pairs 240, 242 of the feedthroughs 134 for differential write and read signals.

FIGS. 21–22 provide an alternative embodiment for the feedthrough assembly 236 which embeds the adjacent pairs 240, 242 in an insulating member 244, such as a glass disk. This can improve performance of the differential pairs by removing undesired capacitance or other effects from the intervening layer of metal between the feedthroughs 136 shown in FIG. 19.

It will now be understood that the present invention (as embodied herein and as claimed below) is generally directed to a hermetically sealed housing, such as for use in a data storage device.

In accordance with preferred embodiments, a housing (such as 101) is formed of opposing substantially planar first and second housing members (such as 102, 104) coupled together to form a hermetically sealed interior environment. An internally mounted shaft (such as 160, 170, 190) is provided with a medial portion (such as 162) which supports an article (such as 106, 110) rotatable within the interior environment. The shaft further has a proximal end supported by the first housing member, and a distal end opposite the proximal end. Means are provided for supporting a distal end of the shaft within the interior environment.

In some embodiments, the means for supporting the distal end preferably comprises a tapered surface (such as 164, 174) on the distal end of the shaft, and a recess (such as 168, 178) which extends into the second housing member. The tapered surface is guided into and retained by the recess when the second housing member is brought into alignment with the first housing member. A layer of compliant material (such as 180) is further disposed within the recess, as desired.

In other embodiments, the means for supporting the distal end preferably comprises a recess (such as 192) which extends into the distal end of the shaft and a pin (such as 194) which is affixed to and projects away from the second housing member, wherein the pin is guided into and retained by the recess when the second housing member is brought into alignment with the first housing member.

For purposes of the appended claims, the recited "means for supporting" will be understood consistent with the foregoing discussion to correspond to the various structures disclosed in FIGS. 6–9, and so this element will be construed as these various structures and equivalents thereof. Prior art methodologies that use a fastener or other structure that projects through the base deck or top cover do not carry out the recited function, and are therefore not covered by the scope of the element and are expressly excluded as an equivalent.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the housing without departing from the spirit and scope of the present invention.

In addition, although the embodiments described herein are directed to the hermetic sealing of a data storage device housing, it will be appreciated by those skilled in the art that the housing can be used for various other types of sealed enclosures without departing from the spirit and scope of the claimed invention.

What is claimed is:

1. A hermetically sealed housing comprising:

opposing substantially planar first and second housing members coupled together to form a hermetically sealed interior environment;

an internally mounted non-rotatable shaft having a medial portion which supports an article rotatable within the interior environment, a proximal end internally supported by the first housing member, and a distal end opposite the proximal end; and means for supporting the distal end of the shaft within the interior environment comprising an interior recess which extends into the second housing member, a layer of compliant material disclosed within the recess, and an exterior surface on the distal end of the shaft which compressingly engages the layer of compliant material.

2. The housing of claim 1, wherein the exterior surface is tapered.

3. The housing of claim 1, wherein the means for supporting induces localized bowing of the second housing member away from the shaft.

4. The housing of claim 1 characterized as a housing for a data storage device.

5. The housing of claim 4, wherein the rotatable article comprises a rotary actuator which supports a data transducing head adjacent a data storage medium.

6. The housing of claim 4, wherein the rotatable article comprises a data storage medium.

7. The housing of claim 1, wherein the interior environment retains an inert gas atmosphere.

8. The housing of claim 1, wherein an atmosphere in the interior environment comprises helium.

9. The housing of claim 1, wherein the proximal end is press-fit into a corresponding recess in the first housing member.

10. A housing comprising:

a substantially planar first housing member formed from a first material and having opposing interior and exterior surfaces and a thickness therebetween;

a substantially planar second housing member formed from a second material and having opposing interior and exterior surfaces and a thickness therebetween, the second housing member coupled to the first housing member with the respective interior surfaces thereof in a facing relationship to form a hermetically sealed interior environment;

a rotatable article disposed within the interior environment;

an internally mounted non-rotatable shaft having an axis about which the rotatable article rotates, a proximal end and a distal end, the proximal end supported by the interior surface of the first housing member so that a continuous layer of the first material extends between the proximal end and the exterior surface of the first housing member along said axis, and the distal end supported by the interior surface of the second housing member so that a continuous layer of the second material extends between the distal end and the exterior surface of the second housing member along said axis; and a layer of compliant material disposed between the proximal end of the shaft and the exterior surface of the first housing member.

11. The housing of claim 10, wherein the first and second materials comprise a common material.

12. The housing of claim 10, wherein the first and second materials comprise metal.

13. The housing of claim 10, wherein at least a selected one of the proximal and distal ends is inserted into a recess in a corresponding one of the first and second housing members.

14. The housing of claim 13, wherein the at least a selected one of the proximal and distal ends comprises a tapered surface.

15. The housing of claim 10, wherein localized bowing is induced in the second housing member in a direction away from the shaft.

16. The housing of claim 10, wherein at least a selected one of the proximal and distal ends comprises a recess into which a pin is recessed, said pin projecting from the interior surface of a corresponding one of the first and second housing members.

17. The housing of claim 10, wherein the housing is characterized as a housing of a data storage device, and wherein the rotatable article comprises a spindle motor which supports at least one rotatable recording disc.

18. The housing of claim 10, wherein the housing is characterized as a housing of a data storage device, and wherein the rotatable article comprises a rotary actuator which supports a data transducing head or a spindle motor which supports a data recording medium.

19. The housing of claim 10, wherein the interior environment retains an inert gas atmosphere.

20. The housing of claim 10, wherein an atmosphere in the interior environment comprises helium.

21. The housing of claim 10, wherein the proximal end is press-fit into a corresponding recess in the first housing member.

* * * * *